United States Patent [19]

Tolonen et al.

[11] 4,370,170

[45] Jan. 25, 1983

[54] PRODUCING MINIMUM ASPHALT-CONTAINING CATIONIC EMULSIONS EMPLOYING SPECIFIC CONDUCTANCE

[75] Inventors: William J. Tolonen; Armin C. Pitchford, both of Bartlesville, Okla.

[73] Assignee: Phillips Petroleum Co., Bartlesville, Okla.

[21] Appl. No.: 246,543

[22] Filed: Mar. 23, 1981

[51] Int. Cl.³ .............................................. C08L 95/00
[52] U.S. Cl. .................................. 106/277; 252/311.5
[58] Field of Search ...................... 106/277; 252/311.5

[56] References Cited

U.S. PATENT DOCUMENTS

| | | | |
|---|---|---|---|
| 2,933,094 | 4/1960 | Cunniff et al. ........................... | 137/4 |
| 3,344,082 | 9/1967 | Montgomery et al. ........... | 252/311.5 |
| 3,389,090 | 6/1968 | Turk et al. ......................... | 252/311.5 |
| 3,615,798 | 10/1971 | Woodruff ............................. | 106/277 |
| 3,728,278 | 4/1973 | Tramelli ........................... | 252/311.5 |
| 3,975,295 | 8/1976 | Koch .................................... | 252/357 |
| 4,008,096 | 2/1977 | Knapp ................................. | 106/277 |

*Primary Examiner*—Harold D. Anderson
*Assistant Examiner*—Amelia B. Yarbrough

[57] ABSTRACT

Minimum content asphalt-in-water emulsions are prepared employing conductivity measurements. An emulsifying agent e.g., soap and water, a pH adjusting agent e.g., hydrochloric acid, to adjust the pH to be in the approximate range up from about 3 to about 5, and an ionizing salt are brought together and heated to a suitable blending temperature and then blended with asphalt also heated to such a temperature. A method for optimizing conditions to obtain optimum asphalts is set forth.

7 Claims, No Drawings

PRODUCING MINIMUM ASPHALT-CONTAINING CATIONIC EMULSIONS EMPLOYING SPECIFIC CONDUCTANCE

BRIEF SUMMARY OF THE INVENTION

Asphalt emulsions of desired viscosity and other characteristics are produced employing specific conductance in their preparation. Emulsifying agent, e.g., soap and water, acid e.g., hydrochloric acid, to adjust pH to be in the approximate range of from about 3 to about 5 and a salt e.g., calcium chloride are used together with asphalt heated to a desired blending temperature to produce the emulsion.

DETAILED DESCRIPTION

This invention relates to the production of asphalt emulsion. In one of its aspects it relates to the production of a cationic emulsion containing a minimum, but desirable amount of asphalt and having desired viscosity and other properties.

In one of its concepts the invention provides a method for producing a cationic asphalt emulsion by adjusting specific conductance of the emulsifier solution to be admixed with the asphalt to form the emulsion. In another of its concepts the invention involves acidifying the emulsifier agent and water and adjusting specific conductance, as measured with a conductivity meter, by use of a suitable conductance-adjusting salt e.g., calcium chloride.

It is desirable to produce cationic asphalt-in-water emulsions which meet the viscosity requirement of commercial specifications but which will contain an amount of asphalt less than has been before possible.

In recent years, cationic asphalt-in-water emulsions have found increasing use in road paving applications. These emulsions have been found to possess advantageous properties of stability and adhesion to various types of aggregates. They are usually employed in road-paving operations at ambient temperatures which enables easy handling and application of the emulsion to the aggregate.

In the commercial preparation of these asphalt emulsions the SFV (Saybolt Furol Viscosity-ASTM D-88-56) specifications have presented a problem of cost for the ingredients utilized in the emulsion formulation. The most expensive ingredient in the formulation is the asphalt. Accordingly, it is desirable that an emulsion be prepared which meets the specification requirements, but which uses a minimum amount of the asphalt component.

In the preparation of asphalt emulsions for paving applications, high viscosity is desired to prevent the emulsions flowing from the paving surface during application. From an economic standpoint it is obviously desirable to produce a maximum viscosity emulsion for a given asphalt content.

Viscosity of cationic asphalt emulsions is a function of several variables, including pH and specific conductance of the emulsifier solution. A method has been developed to control the emulsion viscosity by varying the amount of inorganic salts, such as $CaCl_2$, and excess acid in the emulsifier solution.

Instead of measuring the emulsion viscosity directly a method also has been developed to adjust the specific conductance of the emulsifier solution which when mixed into the asphalt will yield maximum viscosity for the resulting emulsion. In addition to greater emulsion stability, the maximum viscosity formulation permits the use of less asphalt to satisfy the viscosity specification requirements. Since the most expensive ingredient in the formulation is the asphalt, a considerable saving in formulation cost can be realized.

In the past most soap (emulsifier) solutions used in preparation of cationic emulsions have had very high specific conductance substantially above 10,000 micromhos. Thus, the present invention teaches the use of soap solutions having relatively low specific conductance to achieve maximum viscosity emulsions resulting therefrom. Additionally discovered is the finding that soap solutions yielding maximum viscosity asphalt emulsions are at or near the pH range of 3.0–5.0. It has been discovered that the specific conductance should be generally below 10,000 "$\mu$" (micromhos) to yield maximum viscosity emulsions. The desired specific conductance range in micromhos for cationic emulsions is as follows:

Rapid Set Grades: 1500–3000
Medium Set Grades: 1000–6000
Slow Set Grades: 1000–20000

It appears that specific conductance has not been previously considered when preparing asphalt emulsions. Therefore the use of specific conductance in the preparation of asphalt emulsions to regulate and determine the extent to which salts are to be used appears to be broadly novel.

It is an object of this invention to produce an asphalt emulsion. It is another object of this invention to produce a cationic asphalt-in-water emulsion having a minimum but a desirable amount of asphalt. It is a further object of this invention to provide a method for producing an asphalt emulsion herein described.

Other aspects, concepts, objects and several advantages of the invention are apparent from a study of this disclosure and the claims.

According to the present invention emulsifying agent, pH adjusting agent and a viscosity adjusting salt e.g., calcium chloride, are brought together with asphalt under blending conditions of temperature, ratios, etc.

More specifically, in accordance with an embodiment of the invention an asphalt emulsion is prepared as follows: (1) The emulsifying agent, e.g., soap and water are weighed into a container. (2) The mixture is stirred thoroughly while slowly adding concentrated (~0.2 wt. %) HCl to the container to acidify the mixture to the desired pH in the approximate range of 3 to 5. The resulting mass of the invention is the emulsifier solution. (3) The specific conductance of the emulsifier solution is measured with a conductivity meter and is increased by adding calcium chloride. HCl volume, final pH and specific conductance are recorded. (4) The asphalt is heated to a temperature in the approximate range 240°–260° F. The emulsifier solution is heated to a temperature in the approximate range 120°–130° F. The asphalt and emulsifier are charged to a colloid mill (a blend mill such that asphalt content can be controlled) for blending. The asphalt concentration is adjusted preferably to be in the approximate range 60 to 70 wt. % and emulsifier solution 30 to 40 wt. % and preferably will be at about a 65 to 35 ratio. Asphalt emulsion is produced at approximately 10–20 gal/hr., preferably 15 gal/hr. (5) After about one minute of operation to bring the mill to an equilibrium operating condition, about one quart sample of emulsion is collected for viscosity measurement. (6) Viscosity of the asphalt emulsion varies with the amount of $CaCl_2$ added in the said emulsion solution. If a desired emulsion viscosity, normally maximum viscosity, is not obtained in the prepared formulation, the amount of $CaCl_2$ in the emulsifier solution is varied and the emulsion preparation procedure is repeated. Specific conductance increases with amount of $CaCl_2$ in the emulsifier solution; however, the viscosity increases first with amount of $CaCl_2$ and then decreases, going through a maximum.

Applicable Asphalts

The invention is applicable to the preparation of emulsions from any asphalt, but is particularly applicable to asphalts having a penetration at 25° C. of from 40 to 300 (ASTM D-5).

Applicable Salts

Salts for controlling emulsion specific conductance and therefore viscosity include the alkali metal and alkaline earth metal salts, as can be determined by routine testing. Included and illustrative of such salts are the following which possess suitable solubilities:

| | |
|---|---|
| Lithium bromide | Calcium bromide |
| Lithium chloride | Calcium chloride |
| Lithium fluoride | Calcium nitrate |
| Lithium hydride | Calcium iodide |
| Lithium iodide | Calcium sulfate |
| Lithium nitrate | |
| | Barium bromide |
| Sodium bromide | Barium carbonate |
| Sodium chloride | Barium chloride |
| Sodium fluoride | Barium fluoride |
| Sodium nitrate | Barium iodide |
| | Barium sulfate |
| Potassium iodide | Barium hydrogen phosphate |
| Potassium bromide | |
| Potassium chloride | |
| Potassium fluoride | |
| Potassium nitrate | |
| Magnesium bromide | |
| Magnesium carbonate | |
| Magnesium chloride | |
| Magnesium fluoride | |
| Magnesium nitrate | |

The now preferred salt is calcium chloride.

Applicable Acids

The acid used in the formulation to suitably adjust pH can be HCl, acetic acid, formic acid, sulfamic acid, sulfuric acid and low molecular weight carboxylic acids. The now preferred acid is HCl. The kind and amount of pH adjusting agent can be determined by routine testing.

Applicable Emulsifying Agents

Representative cationic emulsifying agents which can be used in this invention include cetyl trimethylamine bromide, cetyl trimethylethylamine bromide, "tallow" trimethylamine chloride (the term "tallow" referring to the radical of a mixture of fatty acids derived from tallow).

n-octyltrimethylammonium chloride,
n-decyltrimethylammonium bromide,
n-dodecyltriethylammonium hydroxide,
n-tetradecyltrimethylammonium chloride,
n-hexadecyltripropylammonium iodide,
n-octadecyltributylammonium nitrate,
9-octadecenyltriethylammonium chloride,
n-hexadecyltrimethylammonium chloride,
9,12-octadecadienyltrimethylammonium chloride,
9,12,15-octadecadienyltrimethylammonium acetate,
di-n-decyldimethylammonium chloride,
di-n-octyldimethylammonium chloride,
di-n-decyldiethylammonium benzoate,
di-n-tetradecyldimethylammonium chloride,
di-n-octadecyldimethylammonium chloride,
di-n-heptadecyldipropylammonium chloride,
tri-n-octylmethylammonium chloride,
di-n-hexadecyldimethylammonium chloride,
n-dodecylbenzyldimethylammonium chloride,
n-pentadecylbenzyldiethylammonium fluoride,
n-octadecylpropyldimethylammonium salicylate,
n-dodecyl-n-butylbenzylmethylammonium bromide,
n-nonadecyldiethylmethylammonium sulphate,
n-eicosyltrimethylammonium orthophosphate,
1-(2-aminoethyl)-2(4-tetradecenyl)4,5-di-n-butyl-2-imidazoline,
1-(2-aminoethyl)-2(1,1-diethyl-5,7-dodecadienyl)4,5-dimethyl-2-imidazoline,
1-(2-aminoethyl)-2-n-octadecyl-4-ethyl-2-imidazoline,
1-(2-aminoethyl)-2-n-eicosyl-2-imidazoline,
1-(2-aminoethyl)-2-(1,1-dimethyldecyl)2-imidazoline,
1-(2-aminoethyl)-2-(12-heptadecenyl)-2-imidazoline, and
1-(2-aminoethyl)-2-(5,7-heptadecadienyl)2-imidazoline, and the like, including mixtures thereof. The kind and amount of emulsifying agent, or agents, to be used can be determined by routine testing.

Emulsifying agents which can also be used are Arosurf AA-54, Redicote E-53 and the like. The descriptions of said two agents follow.

Arosurf AA-54 is useful in cationic emulsifiers and is provided in the form of an admixture of a chain aliphatic primary mono-amine or a similarly substituted trimethylenediamine and an alkoxylated derivative of said mono-amine (as disclosed in U.S. Pat. No. 3,975,295). The disclosure of the patent is incorporated herein.

Redicote E-53 is a diamine-type mixture compound made by Armak, a subsidiary of AKZONA Inc. The component and composition of this emulsifying agent is not known.

Advantage of the Invention

Viscosity is an important property in the preparation of asphalt emulsions which is included in all commercial specifications. The conventional method of meeting the specified viscosity is by use of the necessary amount of asphalt. Since asphalt is the most expensive ingredient in the emulsion, this method is expensive. According to the invention $CaCl_2$ is used to adjust the specific conductance of the emulsifier solution which in turn controls the viscosity of the asphalt emulsion resulting therefrom. Asphalt requirement can be 2–3 wt. % less on average, representing a reduction in cost. Therefore, this method is novel, speedy, and economical.

Typical Asphalt Formulation

Shown below is a typical emulsion formulation for the study of the effect of specific conductance on emulsion viscosity:

| Component | Concentration (wt. %) |
| --- | --- |
| Emulsifying agent (E-53) | 0.35 |
| Concentrated HCl | 0.07 |
| CaCl$_2$ (salt) | 0.08 |
| Water | 33.2 |
| Asphalt | 66.3 |

In lieu of E-53 other emulsifying agents can be used.

Range of Variables

Emulsions made at and above 0.9 wt. % CaCl$_2$ (46300 micromhos specific conductance) were unstable and the asphalt separated immediately after milling. The broad range for the salt is 0 to 0.9 wt. %, preferably 0.06 to 0.5 wt. %.

Based on experimental work, emulsion is stable when the specific conductance lies between 900–46000 micromhos. Preferred range for CRS (Cation Rapid Set) emulsions is 1500–3500 micromhos.

For an emulsion containing 69 wt. % asphalt the peak viscosity is attained at 2200–2300 micromhos specific conductance.

AA-54 is not water soluble at pH greater than 6.0, and no stable emulsion can be made above this pH.

To produce a pH below 1.9 ordinarily requires an excessive amount of HCl and would not now be practical commercially.

Thus, according to the invention, there has been set forth the formulation for preparing optimum viscosity cationic asphalt emulsions comprising the steps of preparation a soap solution of a cationic emulsifier, and an organic or inorganic ionizing salt and water acidifying the solution thus obtained to a pH of the order of less than about 5, measuring specific conductance of the acidified solution, so operating that the specific conductance will be below about 46000 micromhos, milling the solution and hot asphalt together to produce an asphalt emulsion, measuring the viscosity of the emulsion to insure that it is within a desirable range.

Moreover, to prepare an optimum formulation the following steps can be employed:

1. preparing several soap solutions of cationic emulsifier(s), inorganic or organic ionizing salt and water encompassing a range of salt concentrations.
2. acidifying the soap solutions to a pH of less than 5,
3. measuring specific conductance of the acidified soap solutions and selecting only those with values below 46,000 micromhos,
4. milling hot asphalt and the selected solutions of (3) at the desired asphalt concentrations, thereby preparing several candidate asphalt emulsions,
5. measuring the viscosity of the candidate asphalt emulsions, selecting the one with maximum viscosity as the optimum formulation.

One skilled in the art in possession of this disclosure having studied the same will be able readily to optimize and or select the materials and conditions to prepare a desired asphalt emulsion having a minimum amount of asphalt, according to the invention.

The following are given as an indication to one skilled in the art.

The range of emulsifier concentration will normally be in the approximate range of from about 0.1 to about 0.6 wt. %, the range of salt concentration will be in the approximate range of from about 0.01 to about 2 wt. %, and the pH will be in the approximate range up from about 3 to about 5 with a specific conductance in the approximate range up from about 1500 to about 3500 micromhos, for the now preferred conditions with which to obtain the now preferred results.

Thus it will be seen that asphalt-in-water emulsions comprised of emulsifiers, ionic salts, water, pH adjusting agent and asphalt have been prepared by relying upon a conductivity measuring instrument or measurement to accomplish the addition, in a proper manner and amount, of the ionic salts used to control a specific conductance of the solution and therefore of the asphalt-in-water emulsion resulting therefrom.

The emulsions now preferred are, as noted, cationic emulsions.

Reasonable variation and modification are possible within the scope of the foregoing disclosure and the claims appended to the invention the essence of which is that minimum concentration, desirable asphalt emulsions are obtained by relying upon specific conductance in the preparation of emulsions in which a selected asphalt, which can be emulsified under the given conditions, is milled or compounded together with an emulsifying solution the pH of which has been adjusted, the conductivity being, as required, increased by adding an inorganic or organic ionizing salt, e.g., the calcium chloride.

We claim:

1. A method for preparing an asphalt-in-water emulsion which comprises preparing an emulsifying solution, adjusting the pH of said emulsifying solution to be in the range of about 3 to about 5, increasing the measured, specific conductance of the solution to a value that is in a range of about 900 to about 46,000 micromhos by varying the amount of ionizing salt added to the solution and then compounding the thus prepared solution with asphalt under suitable blending conditions.

2. A method according to claim 1 wherein the asphalt and solution are each of them heated to suitable blending temperature and then blended together.

3. A method according to claim 1 wherein the asphalt concentration is in the approximate range of from about 60 to 70 wt. % and the emulsifier solution is in the range of from about 30 to about 40 wt. % of the final blend of asphalt and emulsifying agent.

4. A method according to claim 1 wherein optimum viscosity cationic asphalt emulsions are prepared by the steps as follows: preparing several solutions of cationic emulsifiers, ionizing salt and water, and composing a range of salt concentrations, acidifying the solutions to a pH of less than about 5, measuring specific conductance of the acidified solutions and selecting those with values below about 46,000 micromhos, milling heated asphalt and the selected solutions at desired asphalt concentrations, thereby preparing several candidate asphalt emulsions, and then selecting those with a desired viscosity as optimum formulations.

5. A method according to claim 4 wherein the solutions of cationic emulsifier are soap solutions.

6. A method according to claim 1 wherein the emulsifier is present in the range of from about 0.1 to about 0.6 wt. %, the salt concentration is in the approximate range 0.01 to 2 wt. %, the pH is in the approximate range of from about 3 to about 5 and the specific conductance is in the approximate range of from about 1500 to 3500 micromhos.

7. A method according to claim 1 wherein a conductivity measuring instrument is employed to properly accomplish the addition of the ionic salt to control the specific conductance of the solution e.g., soap solution and the asphalt-in-water emulsion resulting therefrom.

* * * * *